(12) United States Patent
Iyengar

(10) Patent No.: US 6,937,994 B1
(45) Date of Patent: Aug. 30, 2005

(54) SYSTEM AND METHOD FOR EFFICIENTLY GENERATING MODELS FOR TARGETING PRODUCTS AND PROMOTIONS USING CLASSIFICATION METHOD BY CHOOSING POINTS TO BE LABELED

(75) Inventor: Vijay Sourirajan Iyengar, Cortlandt Manor, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/571,917

(22) Filed: May 16, 2000

Related U.S. Application Data

(60) Provisional application No. 60/184,749, filed on Feb. 24, 2000.

(51) Int. Cl.[7] .............................................. G06F 17/60
(52) U.S. Cl. ..................................................... 705/10
(58) Field of Search ........................ 705/10; 706/925, 706/20

(56) References Cited

U.S. PATENT DOCUMENTS

| | | | |
|---|---|---|---|
| 5,446,919 A * | 8/1995 | Wilkins ....................... 725/35 |
| 5,671,333 A | 9/1997 | Catlett et al. .................. 706/12 |
| 5,754,938 A * | 5/1998 | Herz et al. .................... 725/116 |
| 5,819,247 A | 10/1998 | Freund et al. ................. 706/25 |
| 5,930,803 A * | 7/1999 | Becker et al. ............ 707/104.1 |
| 6,061,658 A * | 5/2000 | Chou et al. ..................... 705/10 |
| 6,119,101 A * | 9/2000 | Peckover ....................... 705/26 |
| 6,182,050 B1 * | 1/2001 | Ballard ......................... 705/14 |
| 6,192,353 B1 * | 2/2001 | Assaleh et al. ................ 706/20 |
| 6,286,005 B1 * | 9/2001 | Cannon ....................... 707/100 |
| 6,301,579 B1 * | 10/2001 | Becker ........................ 707/102 |
| 6,370,513 B1 * | 4/2002 | Kolawa et al. ................ 705/10 |

FOREIGN PATENT DOCUMENTS

EP    1049030 A1 *  11/2000  ........... G06F 17/30

OTHER PUBLICATIONS

Jain et al., Statistical Pattern Recognition: A Review, IEEE Transactions on Pattern Analysis and Machine Intelligence, Col. 22, No. 1, Jan. 2000 [GOOGLE].*

Weiss et al., Maximizing Text-Mining Performance, IEEE, Intelligent Systems, Jul./Aug. 1999.*

"Using EM to Classify Text from Labeled and Unlabeled Documents", by Kamal Nigam, et al., May 11, 1998, pp. 1-18.

"Heterogeneous Uncertainty Sample for Supervised Learning", by David D. Lewis, et al., pp. 148-156.

"Experiments with a New Boosting Algorithm", by Yoav Freund, et al., 1996, pp. 1-9.

(Continued)

*Primary Examiner*—Tariq R. Hafiz
*Assistant Examiner*—Michael C. Heck
(74) *Attorney, Agent, or Firm*—Scully, Scott, Murphy & Presser; Rafael A. Perez-Pineiro

(57) ABSTRACT

A closed loop system is presented for selecting samples for labeling so that they can be used to generate classifiers. The sampling is done in phases. In each phase a subset of samples are chosen using information collected in previous phases and the classification model that has been generated up to that point. The total number of samples and the number of phases can be chosen by the user.

50 Claims, 5 Drawing Sheets

OTHER PUBLICATIONS

Green, et al., "Conjoint Analysis in Marketing: New Developments With Implications for Research and Practice", Journal of Marketing, Oct. 1990, pp. 319.

Green, et al., "Adaptive Conjoint Analysis: Some Caveats and Suggestions", Journal of Marketing Research, vol. XXVIII, (May 1991), pp. 215-222.

Lewis, et al., "A Sequential Algorithm for Training Text Classifiers", AT & T Bell Laboratories; Murray Hill, NJ 07974; USA. In W. Bruce Croft and C.J. van Rijsbergen, eds., SIGIR 94: Proceedings of Seventeenth Annual International ACM-SIGIR Conference on Research and Development in Information Retrieval, Springer-Verlag, London, pp. 3-12

Weiss, et al., "Maximizing Text-Mining Performance", Intelligent Information Retrieval, 1999 IEEE, Jul./Aug. 1999, pp. 63-69.

* cited by examiner

SYSTEM AND METHOD FOR EFFICIENTLY GENERATING MODELS FOR TARGETING PRODUCTS AND PROMOTIONS USING CLASSIFICATION METHOD BY CHOOSING POINTS TO BE LABELED

CROSS-REFERENCE TO RELATED APPLICATION

This application claims the benefit of U.S. Provisional Patent Application Ser. No. 60/184,749, filed Feb. 24, 2000.

BACKGROUND OF THE INVENTION

1. Field of the Invention

This invention relates generally to the fields of data processing and information storage and retrieval. More particularly, the invention relates to methods and apparatus for classification using a chosen set of labeled data and for generating a classification model for targeting products and promotions.

2. Discussion of the Prior Art

Targeting products and promotions to the appropriate set of customers is an important aspect of marketing. Typically, this is done with a classification model based on customer attributes for each product or promotion or for a group of these. For example, a model could indicate high interest for a sports car for customers having attributes such as age below 40 and high income, while low interest in the rest of the customers. Sometimes these models are developed by marketing personnel based on their experience or expertise. This expertise can also be enhanced by sampling the customers with product and promotion offerings or with questionnaires. Such live marketing experiments are relatively easier to do in the e-commerce domain (e.g., offer e-coupons, present product advertisements, present pop-up questionnaires). The response collected from these experiments are then used to develop formal or informal models for targeting the products or promotions in question.

The current approach to sampling is based on an "open loop" system for selecting samples from the customer population. FIG. 1 illustrates the conventional open loop system mechanism 10 whereby given a set of customer attributes (e.g. 100 k customers) 12, random (or stratified) sampling or subset of these customers (e.g., 1000 customers) are selected for test marketing, and a coupon or promotion are offered to this subset at step 15. Then, the responses for this subset are collected step 17a,b and the collected results are input to a model builder 19 which generates a modeled response 20, e.g., for customers of age >40, and income >$200K, offer sports car promotion, else no sports car promotion. The model based on the 1000 customers is then applied to the other 99 k of the customers. Thus, in the simplest form, random sampling is used to select a large enough population of customers for the marketing experiment. For skewed distributions for the response in the customer population this is known to be inadequate. A solution proposed to fix this problem is stratified sampling where the space of customers is partitioned based on attribute values and samples chosen non-uniformly in the various partitions. The problem with stratified sampling is that it still does not guarantee that the samples cover the space efficiently since it is not done using the response information, rather only using the customer attribute information.

It would thus be highly desirable to provide a "closed loop" system methodology for selecting samples used for efficiently building models that may be used for targeting products and promotions.

In the context of generating models for targeting products and promotions, it would additionally be highly desirable to provide a closed loop system methodology for selecting samples used for efficiently building models, wherein the system implements a learning algorithm that achieves high classification accuracy by judiciously selecting and using a reduced labeled data training set.

As vast amounts of data in various forms are available for processing (for example, data in the form of natural language text (electronic mail, web page contents, news, technical and business reports, etc.); image data (satellite images, handwritten text, etc.); and, multiple attribute data on individuals and institutions (survey data, purchase histories, etc.)), there are ever increasing needs for extracting the maximum information out of such data. Various methods have been devised including classification—whereby a piece of data is classified into various categories. Classification applications typically implement supervised learning techniques since they require training data that contains examples for which the categories have been determined. The process of obtaining this training data is also called labeling (i.e., labeling each item in the training data with its category). The labeling process can be very expensive since, in most cases, it has to be done manually by persons with domain knowledge. For example, instances of electronic mail queries are examined manually and labeled as belonging to various categories. Such labeled data is then used by one of many methods for classification that can be used subsequently to automatically classify new data into categories. The accuracy of this classification depends on the quality and the quantity of the training data. Having higher quality and larger amounts of training data are two factors both of which usually result in higher accuracies for the classifiers. This has motivated work on methods of generating accurate classifiers that require reduced amounts of labeled training data.

Various methods have been attempted to reduce the amount of labeled training data for classification. Any method that creates artificial data for labeling is not useful since the artificially generated data may not have any meaning to the domain expert doing the labeling. Hence, the only relevant methods are those that choose a subset for labeling from the entire set of unlabeled data and then generate a classifier using the labeled subset.

Random sampling techniques, such as described in W. G. Cochran, Sampling Techniques, John Wiley & Sons, 1977, are clearly ineffective since the various categories can have very skewed distributions and instances of infrequent categories can get omitted from random samples. Stratified sampling techniques, such as described in the above-mentioned "Sampling Techniques" reference, is a method developed to address this problem with random samples. The unlabeled data is partitioned based on the attributes of each point in the data. Sampling is then done separately from each partition and can be biased based on the expected difficulty in classifying data in each partition. This approach is not very effective in high dimensional real life data sets where such partitions are difficult to generate.

Uncertainty sampling methods iteratively identify instances in the data that need to be labeled based on some measure that suggests that the labels for these instances are uncertain despite the already labeled training data. Various methods for measuring uncertainty have been proposed. In one scheme described in the reference to David D. Lewis and W. A. Gale entitled A Sequential Algorithm For Training Text Classifiers, SIGIR 94: Proceedings of Seventeenth Annual International ACM-SIGIR conference on Research and Development in Information Retrieval, pp. 3–12, 1994, a single classifier is used that produces an estimate of the degree of uncertainty in its prediction. The iterative process then selects some fixed number of instances with the maximum uncertainty for labeling. The newly labeled instances are added to the training set and the classifier is generated using this larger training set. This iterative process continues until some stopping criteria is satisfied. A more general version is described in U.S. Pat. No. 5,671,333 where two classifiers are used, the first one to determine the degree of uncertainty and, the second one to do the classification.

A general approach of using multiple classifiers is called "query by committee" (see Seung, H., et al. Query by Committee. In Proceedings of the Fifth Annual ACM Workshop of Computational Learning Theory, pp. 287–294, 1992 and Freund, Y., et al. Information, prediction and query by committee. In Advances in Neural Informations Processings Systems 4, San Mateo, Calif., 1992 Morgan Kaufmann). In this method, two classifiers consistent with the labeled training data are randomly chosen. Instances of the data for which two chosen classifiers disagree are chosen as candidates to be labeled. While "query by committee" has been studied theoretically, its effectiveness on real world tasks is not yet proven.

Another related area of the prior art is the use of an ensemble of classifiers to enhance the accuracy of the classification (see Sholom M. Weiss, et al., Maximizing Test-Mining Performance, IEEE Intelligent Systems & their application, July/August 1999, Vol. 14, No. 4 and U.S. Pat. No. 5,819,247). In these methods, multiple classifiers are generated from data obtained by resampling from the training set using weights for including each instance in the sample. The weights are generated using feedback from the generated classifiers biasing it towards including those instances in the labeled training data that were difficult to classify (i.e., had more errors). The term "adaptive resampling" has been used to refer to such methods. The final classification is arrived at by combining the ensemble of classifiers using some weighting scheme. The weighting scheme could range from a simple majority vote over the multiple classifiers to some more complicated function to combine the results from the ensemble. These techniques have been very successful in achieving high accuracy for practical classification problems in various domains.

It would be further desirable to provide a system and methodology for selecting samples, collecting responses, and building a model by implementing a learning algorithm that achieves a high classification accuracy and which can be applied to all domains.

SUMMARY OF THE INVENTION

It is an object of the invention to provide a "closed loop" system methodology for selecting samples used for efficiently building models that may be used for targeting products, promotions, surveys, and like marketing applications.

It is a further object of the invention to provide a "closed loop" system methodology for selecting samples used for efficiently building models, wherein the methodology implements a learning algorithm that achieves a high classification accuracy by judiciously selecting and using a reduced labeled data training set.

It is another object of the invention to provide a "closed loop" system methodology for iteratively selecting samples used for efficiently building models, wherein a computer implemented method is implemented for selecting data instances that need to be labeled to form a classification data training set.

It is yet still another object of the present invention to provide a "closed loop" system methodology for iteratively selecting samples used for efficiently building models where the resultant selected, labeled classification data training set may be used as for purposes including building other classifiers.

It is still another object of the present invention to employ a first classifier device to "guess" the labels of the unlabeled instances as a step in the process of selecting instances to be labeled and to use adaptive resampling methods with a second classifier to generate an ensemble of classification models that are combined to form the final classification solution.

Thus, according to the principles of the invention, there is provided a closed loop method of selecting samples used for the generation of classifiers. The sampling is broken up into phases where in each phase a subset of the samples are chosen using information from the collected responses up to that point and the model that has been generated using these collected responses. The total number of samples and the number of phases in which these samples are collected are quantities that can be chosen by the user. In a first phase, a subset of samples may be selected as before using random or stratified sampling. The collected response is used to build a model and, the collected response and the model built are then used along with customer attribute data to select another subset of samples for collecting responses. Many possible methods including those employing "active learning" may be implemented for selecting. The collected response from the second sample is added to the total set of collected responses and, the model is generated again based on this total set. The process of selecting samples, collecting responses and building a model is repeated until an adequate number of responses have been gathered and an accurate enough model has been generated.

The foregoing objectives of the invention are achieved by providing a system and methodology which comprises obtaining unlabeled data, selecting from this unlabeled data, labeling the selected data and moving it to a labeled data set, classifying the unlabeled data using a first classification method, generating an ensemble of classification models using adaptive resampling with a second classification method, calculating weights to be used for selecting based on said first classification results and second classification models, and combining the ensemble of classifiers into a final classification model.

Advantageously, the closed loop system achieves higher classification accuracy for marketing applications such as targeting products and promotions, surveys and the like, as compared to traditional methods. Furthermore, the resultant classifier device of the invention achieves higher classification accuracy as compared to traditional methods based on experiments with active learning in other domains, and further achieves like classification accuracy as traditional methods while requiring a smaller set of selected labeled data instances.

BRIEF DESCRIPTION OF THE DRAWINGS

Further features, aspects and advantages of the apparatus and methods of the present invention will become better

DETAILED DESCRIPTION OF THE PREFERRED EMBODIMENT

Figure 1:
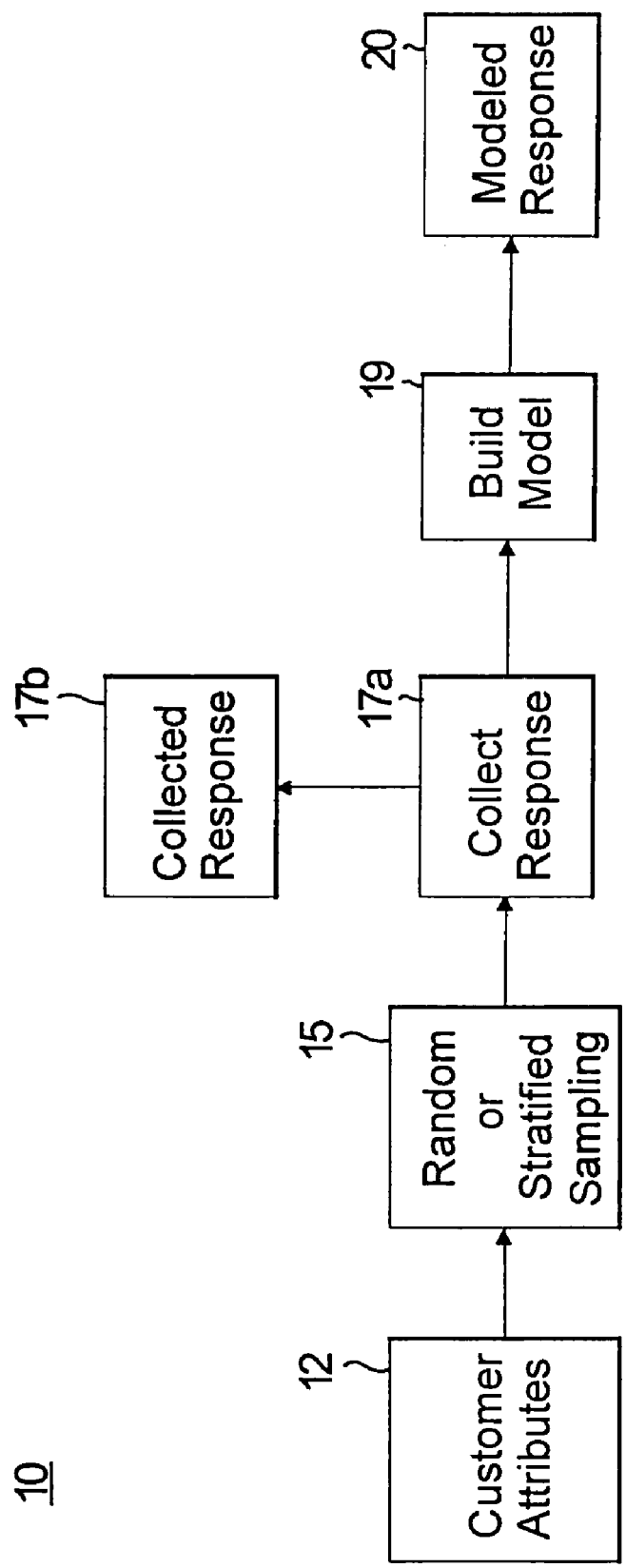
FIG. 1 illustrates the conventional open loop system model building process for targeting products and marketing promotions and like, according to the prior art.
Figure 2:
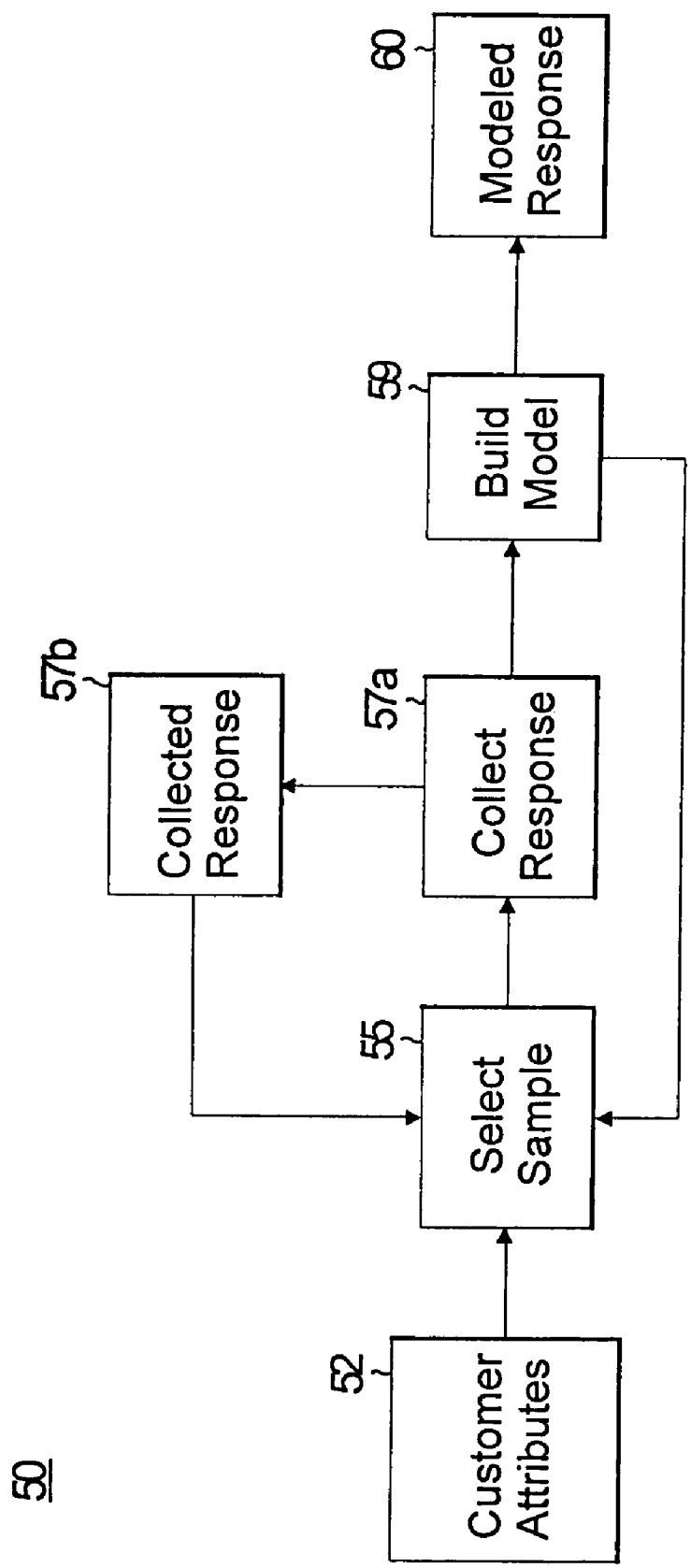
FIG. 2 illustrates the closed loop system model building process for targeting products and marketing promotions and like, according to the principles of the present invention.

As illustrated FIG. 2, the present invention implements a closed loop system 50 of selecting samples according to an iterative process that will be described in greater detail herein. Generally, as shown in FIG. 2, given the customer attributes 52, a customer sample is selected 55 according to techniques described herein, and the responses from the sampled customers are collected and stored at 57a,b. Then the model is built 59. As the process 50 is iterative, the customer sampling is broken up into phases where in each phase, a subset of the samples are chosen using information from the collected customer responses up to that point and the model that has been generated using these collected responses. The total number of samples and the number of phases in which these samples are collected are user programmable. In a first phase, a subset of samples may be selected as before, for example, using random or stratified sampling. The collected response is then used to build a classification model that relates the customer response to the customer attributes. In the nomenclature used for classification technology, the customer responses serves as the labels and the customer profile serve as the attributes. Without a customer's response the customer's attributes represent unlabeled data. The collected response 57b and the model built 59 are then used along with customer attribute data to select another sample of customers for collecting responses. The collected response from the second sample is added to the total set of collected responses. The model is generated again based on this total set. The process of selecting samples, collecting responses and building a model is repeated until an adequate number of responses have been gathered and an accurate enough model 60 has been generated. This can be assessed by noticing that the model accuracy does not improve with more samples. The accuracy of the model 60 generated for targeting products and promotions using this closed loop system 50 will be higher than traditional systems based on experiments with active learning in other domains. That is, the resultant modeled response 60 will achieve a higher desired accuracy, or achieve the same accuracy as prior art techniques using fewer samples of customers.

Figure 3:
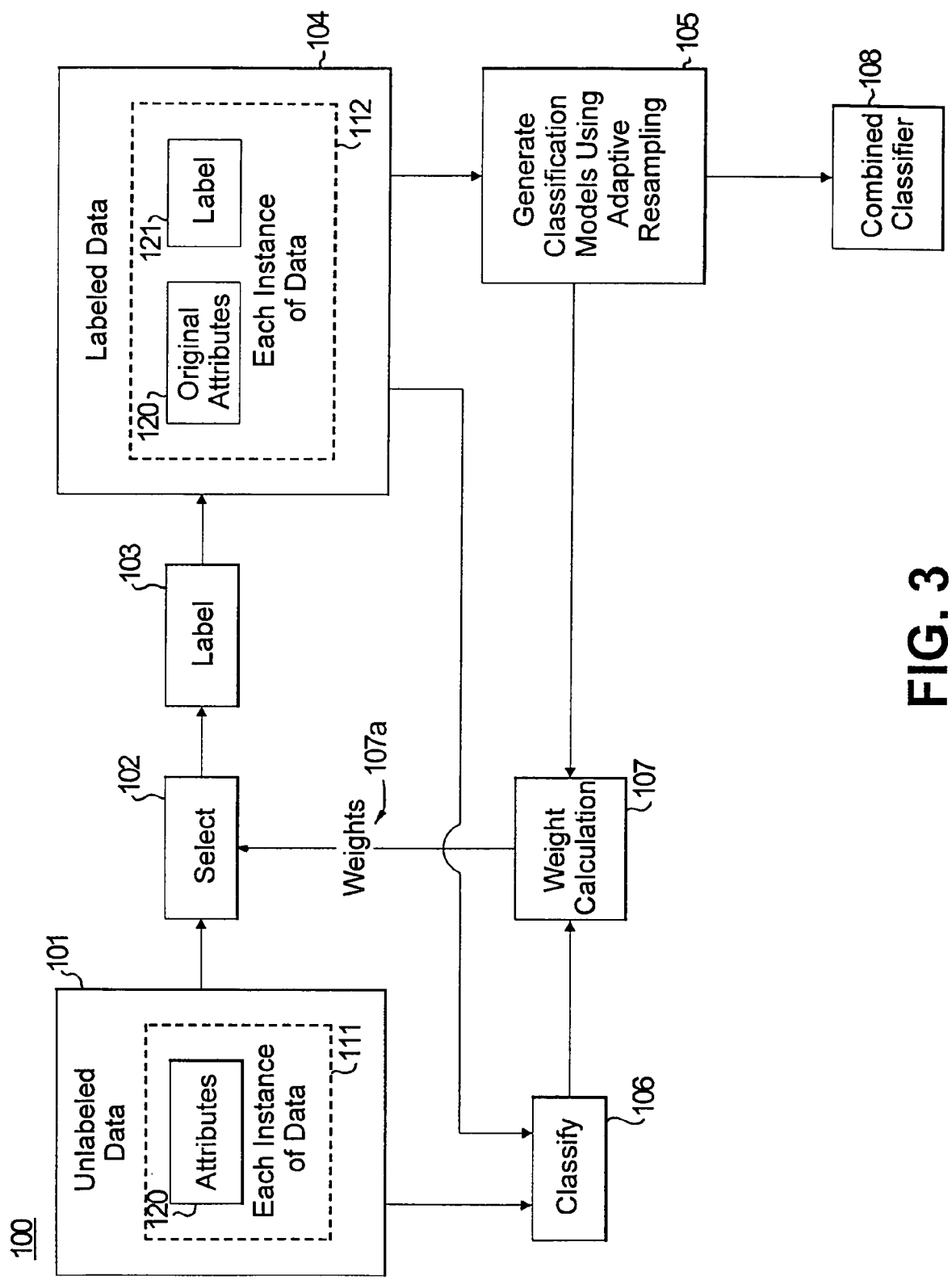
FIG. 3 is a block diagram of the classification apparatus/methodology according to the preferred embodiment of the invention.

As will be described, the sample selection step 55 may implement one or more of the prior art "active learning" techniques, such as described in U.S. Pat. Nos. 5,819,247 and 5,671,333. However, a preferred active learning technique according to the principles of the invention will now be described in greater detail herein Referring now to FIG. 3, there is depicted a first embodiment of the system 100 of the present invention which includes a mechanism for obtaining, or accessing, a collection of unlabeled data in a database or other type of storage device 101. The unlabeled data consists of many instances, and, in the context of the invention, each instance 111 of this data comprises a set of attributes 120. An attribute may be one of many types. Commonly occurring types of attributes include numerical attributes and categorical attributes. Then, as shown in FIG. 3, a subset of the unlabeled data is selected and removed from the unlabeled data set at step 102. As will be described, the selection is done by using weights 107a for each instance of unlabeled data that indicates the importance of selecting that instance. The number of instances selected may be varied each time the selection process is invoked. As indicated at step 103, each instance in the selected subset is labeled into categories either manually or by some reliable labeling method. According to the principles of the invention, the amount of labeling that is needed to achieve acceptable accuracy in the final classification is reduced.

The selected subset after labeling is added to the labeled data set 104. The labeled data set 104 thus comprises many instances with each instance 112 comprising the original set of attributes 120 that were in this instance as a part of the unlabeled data 101 and the label 121 that was added at step 103.

As further shown in FIG. 3, the unlabeled data 101 is classified using a first classification method C1 at block 106. At this block, "guessed" labels are generated by this first classification method and used for a first weight calculation 107 which generates weights 107a. Since this classification method may be applied to the entire unlabeled data set, the computational requirements are considered when choosing this first classification method C1.

In the preferred embodiment, at block 105, the labeled data 104 is used to generate an ensemble of classifiers using adaptive re-sampling according to a second classification method C2. The ensemble of classifiers are generated in an iterative fashion where each iteration includes: 1) sampling from the labeled data using a set of probabilities for each instance of the labeled data, e.g., a function of error; 2) utilizing this sampled data with a second classification method to generate a classification model; and 3) utilizing the results of the previous classifications to compute new probabilities for each instance of the labeled data. This iterative process referred to as adaptive re-sampling is performed to generate an ensemble of classification models. The number of classification models in the ensemble may be determined by various methods.

The resulting ensemble of classification models at step 105 and guessed labels for the unlabeled data at block 106 are used to calculate weights 107a for each instance of the unlabeled data for use in the selection process at 102. The weight 107a for each instance reflects the importance of selecting it the next time the select block 102 is invoked. The weight calculation may be varied each time the weight calculation is performed at step 107.

The steps of selection 102, labeling 103, addition to the labeled data set 104, generation of an ensemble of classification models using adaptive re-sampling 105, classifying unlabeled data using a first classification method 106 and weight calculation 107 are repeated in an iterative fashion until the required number of instances are added to the labeled data set. Each iteration of these steps is called a phase and the number of iterations is referred to as the number of phases. The generation of an ensemble of classification models using adaptive re-sampling at step 105 is invoked after the last addition to the labeled data set in Block 104. It is understood that the ensemble of classification models generated in all the invocations of block 105 are combined to form the final resultant classifier 108 that is output.

According to another aspect of the invention, the labeled data set in 104 is another output of this invention and may be used as a selected, labeled training data for other purposes including use by other classifiers.

In a preferred embodiment, the selection performed at step 102 invokes a normalization process where the weights for each instance of the unlabeled data are normalized by dividing it by the sum of the weights of all instances and using the normalized weight as a probability measure of selecting that instance. After the selection of each instance, the weight of the selected instance is zeroed out and the weights re-normalized from the remaining unlabeled instances not yet selected. In another embodiment, the selection at 102 is performed by sorting the instances by weight and picking the largest weight instances. In one embodiment, the number of instances selected in each phase can be specified by the user. Preferably, the user specifies the number of phases and total number of instances to be added to the labeled set which are divided equally amongst all the phases.

Figure 4:
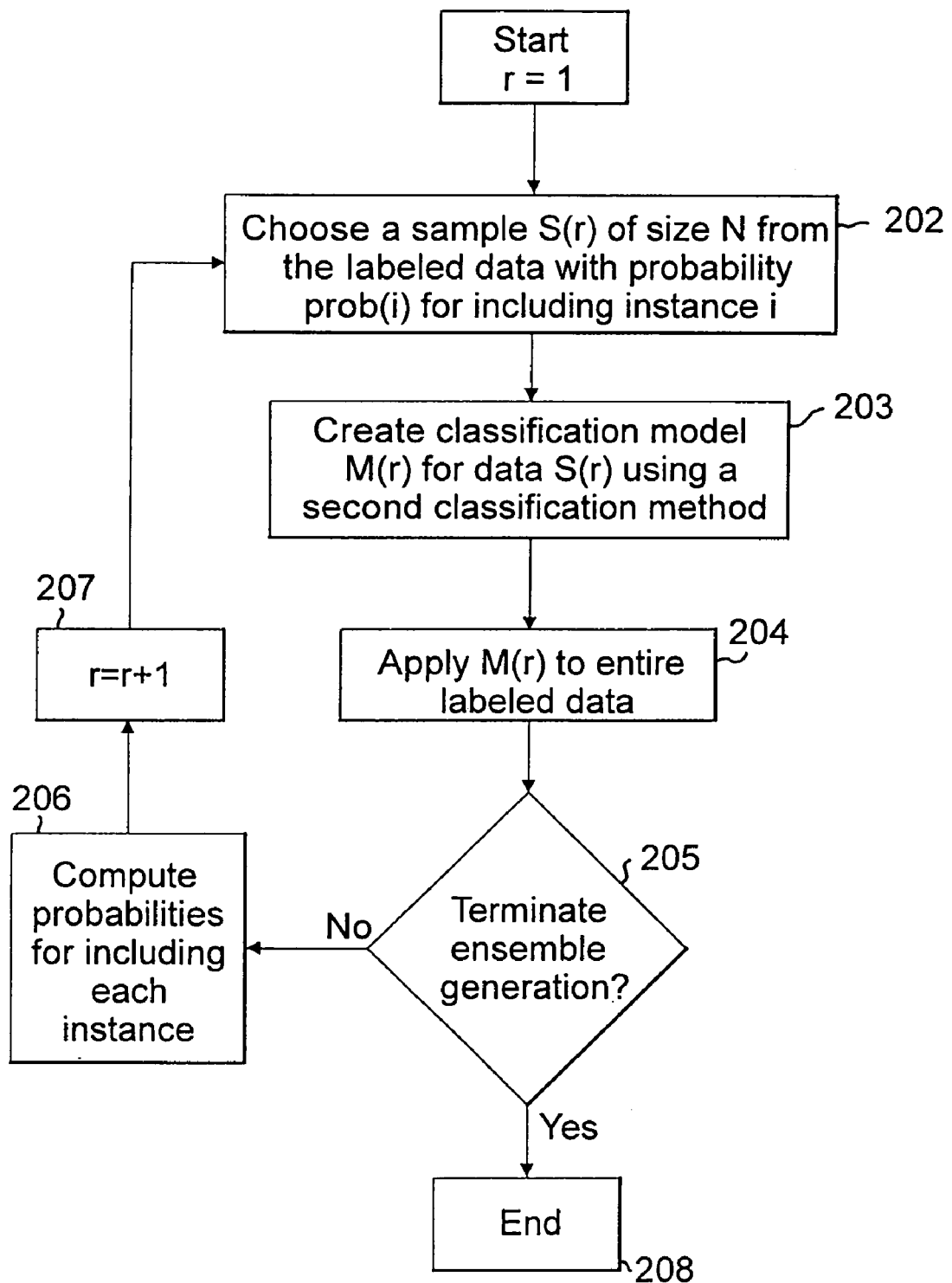
FIG. 4 is a flow diagram describing the steps used to perform the generation of classifiers using adaptive re-sampling according to block 105 in FIG. 3.

In a preferred embodiment, the generation of classification models using adaptive re-sampling at block 105 in FIG. 3, is performed in an iterative manner as illustrated in detail in FIG. 4. Referring to FIG. 4, the generation process begins at step 201 by initializing an index variable "r" to 1. At step 202, a sample S(r) of size N is chosen in each iteration from the labeled instances in 104 (FIG. 3) using the probabilities prob(i) for each instance i. At step 203, a classification model M(r) is created by training with the chosen labeled sample S(r) using a second classification method C2. The model M(r) is applied to the entire set of labeled instances at 104 of FIG. 3. If a termination criterion for the iterations is satisfied at step 205, this iterative process exits with the ensemble of created models M(r). In a preferred embodiment for step 205, the termination criterion is to iterate a user specified number of times. If the termination criterion is not satisfied, then results of applying all the previously created models M(r) on the entire labeled data are used to compute probabilities for choosing each instance in the sample S(r+1) in the next iteration. The iteration count r is incremented at step 207 and the process of computing, choosing, creating, and applying is repeated while the termination criterion is not satisfied.

Referring to FIG. 4, in a preferred embodiment for implementing step 202, the probabilities are initialized to make each instance equally likely to be chosen. In a preferred embodiment for step 203, the second classification method C2 is a decision tree classifier. An example implementation for computing the probabilities at step 206, is described in Weiss, et al., Predictive Data Mining: A practical Guide, Morgan Kauffman, 1998, the contents and disclosure of which is incorporated by reference as if fully set forth herein, which sets forth the following formula:

$$\text{prob}(i) = (1 + \text{error}(i)^3) \Big/ \sum_j (1 + \text{error}(j)^3)$$

where, for prob(i) for each instance i, the error(i) is the cumulative error for instance i over all the models M(r) created so far. The summation in the denominator is over all the labeled data j. Still another embodiment for performing step 206 in FIG. 4 is the methodology described in U.S. Pat. No. 5,819,247.

Referring back to FIG. 3, an example implementation for "guessing" the labels for the unlabeled data at step 106 is to use a nearest neighbor classification algorithm such as described in Weiss, et al., Computer Systems that Learn, Morgan Kaufmann, 1991, pp. 70–72, the contents and disclosure of which is incorporated by reference as if fully set forth herein. For each instance of unlabeled data, the nearest neighbor classification algorithm determines the K nearest neighbors in the labeled data and then use the dominant class amongst their class labels as the guess labeled for the unlabeled data instance. Thus, as shown in FIG. 3, there is provided an input from the labeled data set 104 to the first classifier block 106. In another embodiment for step 106, the classification models available in the ensemble E are combined to form a classifier to guess the labels for the unlabeled data. In one embodiment, the combination is performed by weighted voting over all the classification models in E. In another embodiment, all models are uniformly weighted.

Referring to FIG. 3, a preferred system for calculating weights for each instance i of the unlabeled data in step 107 is to calculate the guessed cumulative error, cumul(i), for instance i by applying all the models M(r) to the instance i assuming that its class is the guessed class produced by block 106. The weight for instance i is then computed as a function of the guessed cumulative error for instance i. In one embodiment, the formula given below is used to calculate the weight for instance i;

$$\text{weight}(i) = (1 + \text{cumul}(i)^3)$$

In another embodiment, the guessed cumulative error itself may be used as the weight for each instance of the unlabeled data.

In a preferred embodiment of the invention, the output classifier is formed by combining the classifiers in step 108 which is accomplished by applying a chosen subset of the classification models generated in step 105 to a data instance and then picking the dominant class as predicted by the chosen subset of classification models as the predicted class for the data instance. In one embodiment, the entire set of classification models generated in block 105 may be chosen. Alternatively, the set of classification models that were generated in the last application of block 105 after all the labeled data selection was completed may be chosen. Still another system employed for step 108 may be the classification model described in U.S. Pat. No. 5,819,247.

Figure 5:
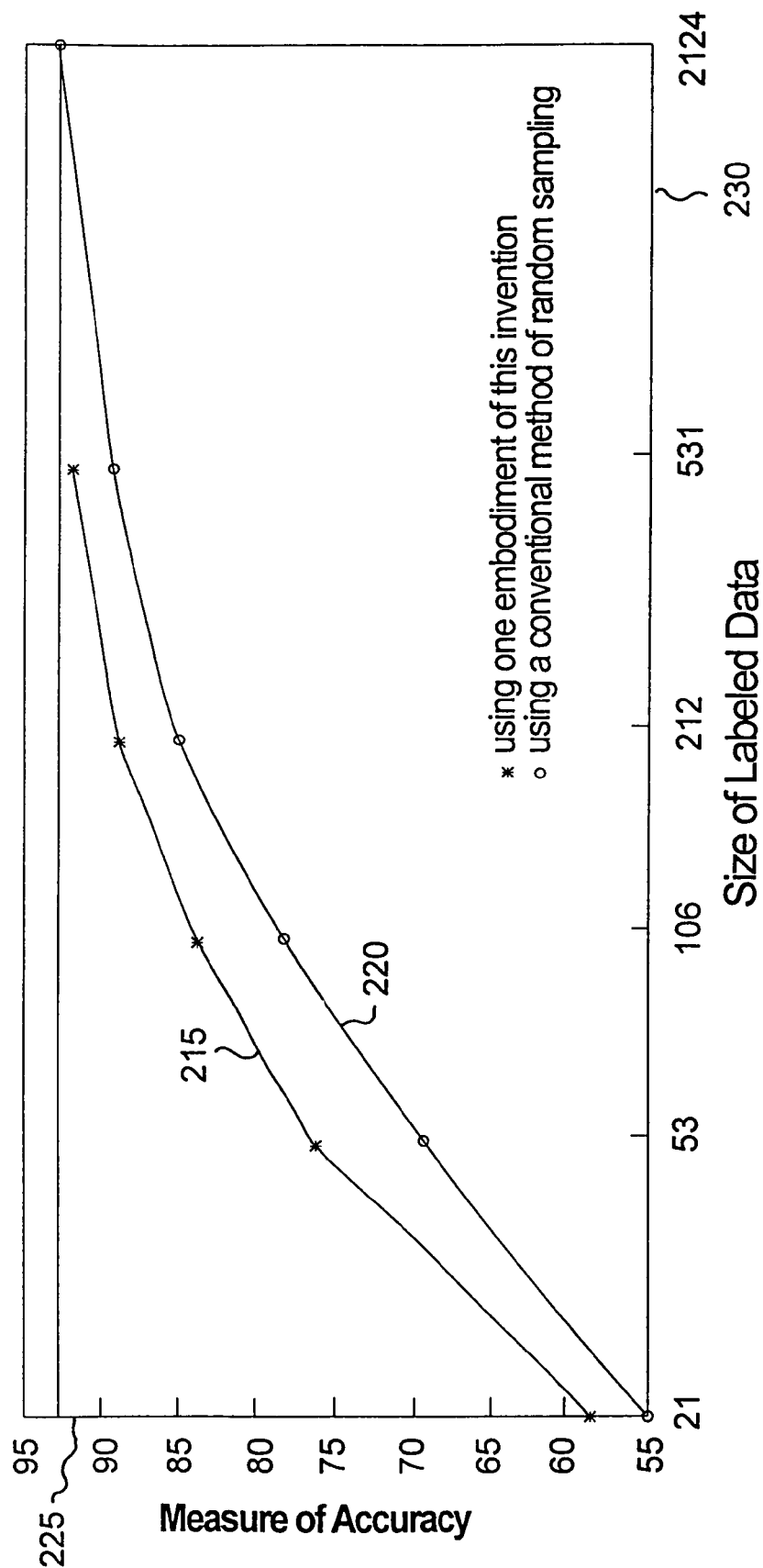
FIG. 5 is a graph illustrating improvement in the solution achieved by the use of the present invention over conventional methods for a particular example benchmark.

Illustrating the advantages provided by the present invention, an example use of the present invention was applied to a benchmark called internet-ads available in a repository (UCI repository of machine learning databases, University of California, Irvine, Department of Information and Computer Science. In this benchmark, various attributes related to images being displayed on web pages are used to identify whether or not the corresponding images are internet advertisements or not. This task requires instances of the data to be labeled as being internet advertisements or not. The system of the present invention was used to perform this task with a smaller number of labeled instances. A standard evaluation criterion for such benchmarks is a measure of accuracy computed as the arithmetic mean of precision and recall. For this problem, recall is the percentage of internet-ads in the data that were correctly identified as being such and, precision is the fraction of instances of those identified by a classification method as being internet-ads that were correctly identified expressed as a percentage. FIG. 5 graphically illustrates the improvement in the solution achieved by the present invention when compared over conventional methods. FIG. 5 specifically plots the accuracy 225 achieved against the number of instances 230 in the labeled data (i.e., the size of the labeled data set). Two curves are plotted in FIG. 5, one using an embodiment of this invention 215 and the other using a conventional system 220 of adaptive resampling using decision trees on random samples for the labeled set of instances. The maximum size for the labeled data for these experiments was 2124 instances, because instances in the benchmark with missing attribute values were excluded and the standard evaluation technique of 10-fold cross validation was used. The plots in FIG. 5 illustrate that an embodiment of this invention achieves with only 531 selected labeled instances approximately the accuracy of the conventional system with 2124 labeled instances. Also, for any given size of the labeled set, the accuracy of the system of this invention 215 is higher than that of the conventional system 220.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A method of using a computer for targeting products and promotions to candidate sets of customers having attributes, said method iteratively implementing phases with each phase comprising the steps of:
   a) storing unlabeled customer data in a storage device, each unlabeled customer data having one or more customer attributes;
   b) implementing a means for selecting a subset of unlabeled customer data from said storage device, said selecting means responsive to received guessed labels generated for unlabeled customer data instances in said selected subset according to a first classification method and, further responsive to weights computed for unlabeled data instances using said guessed labels;
   c) implementing a means for labeling the selected subset of unlabeled customer data using external information and adding said labeled data subset to a labeled data set, said labeled data set comprising one or more labeled data instances;
   d) implementing a model generator device for retrieving said labeled data set and generating one or more classification models, said customer classification model generating comprising steps of:
      i) initializing an iteration index r;
      ii) initializing a first set of probabilities for each labeled instance in said labeled data set;
      iii) choosing a sample S(r) of labeled instances from the labeled data set using said probabilities;
      iv) generating a classification model M(r) for data in S(r) using said second classification method;
      v) applying said classification model M(r) to the entire labeled data set;
      vi) computing a second set of probabilities for including each instance;
      vii) incrementing said iteration index r;
      viii) repeating steps iii)–vii) until a predetermined termination criterion is satisfied;
   f) applying one or more generated classification models M(r) and said guessed labels for unlabeled data instances to compute said weights in step b); and utilizing said weights for selecting a next subset from remaining unlabeled data stored in said storage device in a subsequent phase; and,
   g) repeating step b) through f) in each phase until a termination criterion is satisfied; and
   h) implementing a device for combining each of said generated one or more classification models M(r) into a resultant classifier model, said resultant classifier model adapted to determine suitability of potential customers for receiving targeted products and promotions, wherein said resultant classifier model is based on a reduced amount of labeled data set instances with increased classification accuracy.

2. The method as claimed in claim 1, wherein said labeling step c) is performed manually.

3. The method as claimed in claim 1, wherein said selecting step b) comprises the steps of:
   normalizing the computed weights to obtain a probability measure;
   utilizing said probability measure to select said subset of one or more instances from said set of unlabeled data; and,
   repeating the steps of normalizing and utilizing until a number of instances for said subset have been selected.

4. The method as claimed in claim 3, wherein said selecting step b) further comprises the step of resetting the weight utilized for the selected instance for each repeated normalizing and utilizing iteration.

5. The method as claimed in claim 1, wherein said selecting step b) comprises the steps of:
   sorting instances in said unlabeled data set by weight; and,
   selecting a subset having instances with the greatest weights.

6. The method as claimed in claim 1, wherein a termination criterion is based on a final size of the labeled data set, a predetermined total number of phases and a final size of the labeled set being user specified,
   whereby said number of instances to be selected in each subset for each phase is computed as a ratio of said final size to said total number of phases.

7. The method as claimed in claim 1, wherein a number of instances for each subset is user specified.

8. The method as claimed in claim 1, wherein said first classification method employed in step d) implements a nearest neighbor classification algorithm using said one or more attributes.

9. The method as claimed in method of claim 1, wherein said computing step f) includes the step of estimating a cumulative error cumul(i) for each instance i in said unlabeled data set over all said one or more classification models and utilizing said guessed labels generated by said first classification method as a reference.

10. The method as claimed in method of claim 9, wherein after estimating said cumulative error cumul(i), a step of calculating for each instance i in said unlabeled data set a weight(i) according to:

$$weight(i) = (1 + cumul(i)^3).$$

11. The method as claimed in claim 1, wherein said combining step h) comprises the steps of:
   applying a chosen subset of classification models from said generated one or more classification models to any data instance; and, selecting a dominant class predicted by said classification models as the predicted class for that instance.

12. The method as claimed in claim 11, where said chosen subset of classification models comprises an entire set of generated classification models.

13. The method as claimed in claim 11, where said chosen subset of classification models comprises those one or more classification models that were generated after all the instances have been added to said labeled data set.

14. The method as claimed in claim 1, wherein said classifying step d) includes combining prior generated one or more classification models.

15. The method as claimed in claim 14, further including the step of voting across all models of said generated one or more classification models to combine said models.

16. The method as claimed in claim 1, wherein said initializing step j) includes the step of assigning a uniform distribution for each instances in said labeled data set.

17. The method as claimed in claim 1, wherein said second classification method employed in step l) implements a decision tree classifier.

18. The method as claimed in claim 1, wherein said termination criterion comprises a predetermined upper limit for said index r.

19. The method as claimed in claim 1, wherein said computing step n) comprises utilizing a probability measure prob(i) for each instance i in said second set of probabilities according to:

$$\text{prob}(i) = (1 + \text{error}(i)^3) \Big/ \sum_j (1 + \text{error}(j)^3)$$

where error(i) is a cumulative error for each instance i over all said models M(r) and $$\sum_j (1 + \text{error}(j)^3)$$

is a cumulative error over all the labeled data j.

20. The method as claimed in claim 1, wherein a resultant labeled data set functions as a training set of data to be used in the generation of other classification models.

21. A closed-loop system for generating a classifier model to be used for marketing applications including the targeting of products and promotions to potential customers, each customer having one or more associated attributes, said closed-loop system comprising:
  selector mechanism for iteratively selecting a subset of said customers to which a marketing application is to be targeted from an unlabeled data set, said mechanism sampling a subset of unlabeled data in a first iteration, and selecting further subsets of unlabeled data in subsequent iterations based on computed weights;
  mechanism for collecting responses from said customers related to said targeted marketing application at each iteration;
  a model generator for receiving collected responses, generating labeled data instances by labeling said customers according to their responses, and building one or more classification models using said one or more attributes for classifying other subsets of potential customers in each iteration based on said labeled data instances, said selector mechanism receiving said one or more classification models and said collected responses for a current iteration and computing a new set of weights for selecting the next subset for the next iteration, said step including utilizing said weights for selecting a next subset from remaining unlabeled data and said weights representing an importance of a subset to be selected in said next iteration, wherein said model generator comprises:
    a first classification device for generating guessed labels used for classifying unlabeled data instances in each iteration;
    a second classification device employing a decision tree classifier for generating an ensemble comprising said one or more classification models based on selected labeled data instances in each iteration, said selector mechanism further receiving said guessed labels from said first classification device and said ensemble of classification models output from said second classification device for computing a new set of weights; and,
    a device for combining each one or more classification models generated at each iteration into a resultant classifier model after a predetermined condition is satisfied, wherein said resultant classifier model is applied to said potential customers to determine their suitability for receiving said products and promotions of said marketing application.

22. The closed-loop system as claimed in claim 21, wherein said second classification device for generating an ensemble employs adaptive resampling techniques using said one or more attributes.

23. The closed-loop system as claimed in claim 21, wherein said selector mechanism comprises:
  mechanism for normalizing the computed weights to obtain a probability measure at each iteration;
  mechanism for utilizing said probability measure to select said subset of customers.

24. The closed-loop system as claimed in claim 23, wherein said selector mechanism comprises the step of resetting the weights utilized for selecting said customers at each iteration.

25. The closed-loop system as claimed in claim 21, wherein said selector mechanism comprises a mechanism for sorting instances in said unlabeled data set of customers by weight such that said instances are selected in each iteration with the greatest weight.

26. The closed-loop system as claimed in claim 21, further including mechanism for receiving user input for specifying a total number of iterations and a final size of the labeled set, a number of instances to be selected in each phase being computed as a ratio of said final size to said total number of phases.

27. The closed-loop system as claimed in claim 21, wherein a number of instances for each subset is user specified.

28. The closed-loop system as claimed in claim 21, wherein said first classification device for generating guessed labels implements a nearest neighbor classification algorithm.

29. The closed-loop system as claimed in method of claim 21, wherein said selector mechanism comprises mechanism for estimating a cumulative error cumul(i) for each instance i in the unlabeled data set over all said one or more classification models based on said guessed labels generated by said first classification device as a reference.

30. The closed-loop system as claimed in method of claim 29, wherein said estimating mechanism further calculates for each instance i in said unlabeled data set a weight(i) according to:

$$weight(i)=(1+cumul(i)^3).$$

31. The closed-loop system as claimed in claim 21, wherein said combining device comprises a mechanism for applying a chosen subset of classification models from said ensemble of one or more generated classification models to any data instance, whereby a dominant class predicted by said classification models is selected as the predicted class for that instance.

32. The closed-loop system as claimed in claim 31, where said chosen subset of classification models comprises an entire set of generated classification models.

33. The closed-loop system as claimed in claim 31, where said chosen subset of classification models comprises those one or more classification models that were generated after all the instances have been added to said labeled data set.

34. The closed-loop system as claimed in claim 21, wherein said first classification device for generating said guessed labels used for classifying further combines prior generated one or more classification models.

35. The closed-loop system as claimed in claim 34, further including mechanism for voting across all models of said ensemble of generated one or more classification models to combine said models.

36. The closed-loop system as claimed in claim 21, wherein a resultant labeled data set functions as a training set of data to be used in the generation of other classification models.

37. A program storage device readable by a machine, tangibly embodying a program of instructions executable by the machine to perform method steps for iteratively generating a classifier model for classifying data with increased accuracy, said method steps iteratively implementing phases with each phase including the steps of:

a) retrieving a set of unlabeled data, each unlabeled data having one or more attributes;

b) sampling a subset of unlabeled data from said retrieved set in a first iteration, and, selecting a subset from remaining unlabeled data of said retrieved unlabeled data set in each subsequent iteration;

c) labeling the subset of data using external information and transferring said subset of labeled data to a set of labeled data, said labeled data comprising one or more labeled data instances;

d) classifying the unlabeled data in said retrieved set by employing a first classification method to generate guessed labels;

e) generating one or more classification models employing a second classification method, said second classification method performing steps of:

i) initializing an iteration index r;

ii) initializing a firs set of probabilities for each labeled instance in said labeled data set;

iii) choosing a sample S(r) of labeled instances from the labeled data set using said probabilities;

iv) generating a classification model M(r) for data in S(r) using said second classification method;

v) applying said classification model M(r) to the entire labeled data set;

vi) computing a second set of probabilities for including each instance;

vii) imcrementing said iteration index r;

viii) repeating steps iii)–vii) until a predetermined termination criterion is satisfied;

f) computing weights using said guessed labels and utilizing said weights for selecting a next subset from remaining unlabeled data in step b) in a next iteration;

g) repeating steps b) through f) in each phase until a termination criterion is satisfied; and h) combining each of said generated one or more classification models into a resultant classifier model, wherein said resultant classifier model is based on a reduced amount of labeled data set instances with increased classification accuracy.

38. The program storage device readable by a machine as claimed in claim 37, wherein said generating step e) employs an adaptive resampling technique using said one or more attribute.

39. The program storage device readable by a machine as claimed in claim 37, wherein said selecting step b) comprises the steps of:

normalizing the computed weights to obtain a probability measure;

utilizing said probability measure to select said subset of one or more instances from said set of unlabeled data; and, repeating the steps of normalizing and utilizing until a number of instances for said subset have been selected.

40. The program storage device readable by a machine as claimed in claim 37, wherein said selecting step b) comprises the steps of:

sorting instances in said unlabeled data set by weight; and, selecting a subset having instances with the greatest weights.

41. The program storage device readable by a machine as claimed in claim 37, wherein said first classification method employed in step d) implements a nearest neighbor classification algorithm.

42. The program storage device readable by a machine as claimed in method of claim 37, wherein said computing step f) includes the step of estimating a cumulative error cumul(i) for each instance i in said unlabeled data set over all said one or more classification models and utilizing said guessed labels generated by said first classification method as a reference for said estimating.

43. The program storage device readable by a machine as claimed in method of claim 42, wherein after estimating said cumulative error cumul(i), a step of calculating for each instance i in said unlabeled data set a weight(i) according to:

$$weight(i)=(1+cumul(i)^3).$$

44. The program storage device readable by a machine as claimed in claim 37, wherein said combining step h) comprises the steps of:

applying a chosen subset of classification models from said generated one or more classification models to any data instance; and, selecting a dominant class predicted by said classification models as the predicted class for that instance.

45. The program storage device readable by a machine as claimed in claim 37, wherein said initializing step j) includes the step of assigning a uniform distribution for each instance in said labeled data set.

46. The program storage device readable by a machine as claimed in claim 37, wherein said second classification method employed in step l) implements a decision tree classifier.

47. The program storage device readable by a machine as claimed in claim 37, wherein said termination criterion comprises a predetermined upper limit for said index r.

48. The program storage device readable by a machine as claimed in claim 37, wherein said computing step n) comprises utilizing a probability measure prob(i) for each instance i in said second set of probabilities according to:

$$\text{prob}(i) = (1 + \text{error}(i)^3) \bigg/ \sum_j (1 + \text{error}(j)^3)$$

where error (i) is a cumulative error for each instance i over all said models M(r) and $$\sum_j (1 + \text{error}(j)^3)$$

is a cumulative error over all the labeled data j.

49. The program storage device readable by a machine as claimed in claim 37, wherein said resultant classifier model is utilized for marketing products and promotions to potential purchasing customers.

50. The program storage device readable by a machine as claimed in claim 37, wherein a resultant labeled data set functions as a training set of data to be used in the generation of other classification models.

* * * * *